United States Patent [19]

Usui et al.

[11] Patent Number: 5,618,764
[45] Date of Patent: Apr. 8, 1997

[54] COLORED CERAMIC COMPOSITION AND METHOD FOR PRODUCING CURVED GLASS PLATE USING THE SAME

[75] Inventors: Hiroshi Usui; Hitoshi Onoda; Tsuneo Manabe, all of Yokohama, Japan

[73] Assignee: Asahi Glass Company Ltd., Tokyo, Japan

[21] Appl. No.: 527,870

[22] Filed: Sep. 14, 1995

[30] Foreign Application Priority Data

Sep. 14, 1994 [JP] Japan .................................. 6-220375

[51] Int. Cl.$^6$ .............................. C03C 8/14; C03C 8/04; C03C 3/066
[52] U.S. Cl. .................. 501/17; 501/32; 501/26; 501/77; 501/79
[58] Field of Search ................................ 501/17, 32, 77, 501/26, 79

[56] References Cited

U.S. PATENT DOCUMENTS

| | | | |
|---|---|---|---|
| 4,493,900 | 1/1985 | Nishino et al. | 501/26 |
| 4,777,092 | 10/1988 | Kawakami et al. | 501/32 |
| 4,970,178 | 11/1990 | Klimas et al. | 501/26 |
| 5,001,087 | 3/1991 | Kubota et al. | 501/17 |
| 5,153,150 | 10/1992 | Ruderer et al. | 501/17 |
| 5,244,484 | 9/1993 | Chiba et al. | 65/24 |
| 5,306,674 | 4/1994 | Ruderer et al. | 501/70 |
| 5,332,412 | 7/1994 | Manabe et al. | 65/60.2 |
| 5,342,810 | 8/1994 | Merigaud et al. | 501/26 |
| 5,348,914 | 9/1994 | Thometzek et al. | 501/18 |
| 5,421,877 | 6/1995 | Hayakawa et al. | 501/17 |
| 5,547,749 | 8/1996 | Chiba et al. | 501/32 |
| 5,559,059 | 10/1996 | Ryan | 501/26 |

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A colored ceramic composition comprising, as inorganic components, from 5 to 40 wt % of a colored heat resistance pigment powder, from 60 to 95 wt % of a zinc-containing glass powder and from 0 to 10 wt % of a refractory filler powder, wherein said glass powder consists essentially of the following components:

| | |
|---|---|
| $SiO_2$ | 27 to 40 wt % |
| $B_2O_3$ | 10 to 20 wt % |
| ZnO | 35 to 45 wt % |
| $Li_2O$ | 0 to 5 wt % |
| $Na_2O$ | 0 to 10 wt % |
| $K_2O$ | 0 to 5 wt % |
| $Li_2O + Na_2O + K_2O$ | 0 to 15 wt %. |

20 Claims, No Drawings

COLORED CERAMIC COMPOSITION AND METHOD FOR PRODUCING CURVED GLASS PLATE USING THE SAME

BACKGROUND OF THE INVENTION

1. Field of the Invention

The present invention relates to a colored ceramic composition and a method for producing a curved glass plate employing it.

2. Discussion of Background

Heretofore, a colored ceramic paste for an automobile has been widely used which is designed so that a colored ceramic composition in the form a paste is screen-printed along the peripheral portion or at the center portion of a window glass of an automobile, then dried and baked in a step of heating the glass plate for bending.

When baked along the peripheral portion of the window glass, this colored ceramic paste will form a colored opaque layer which is useful for the purpose of preventing deterioration of a urethane sealant by ultraviolet rays or preventing e.g. terminals of heating wires from being seen from outside the automobile. Known as compositions of this type are those having various heat-resistant coloring pigments mixed to low melting point amorphous glass or crystallized type glass which usually contains lead or cadmium, as a base material.

On the other hand, as a glass composition which does not contain lead and cadmium, a zinc-containing system having the following composition has been known (Japanese Examined Patent Publication No. 43296/1986):

| | |
|---|---|
| $SiO_2$ | 10 to 40 wt % |
| $B_2O_3$ | 10 to 35 wt % |
| ZnO | 3 to 51 wt % |
| $Al_2O_3$ | 1 to 15 wt % |
| $Li_2O + Na_2O + K_2O$ | 1 to 20 wt % |
| $TiO_2 + SnO_2$ | 0 to 5 wt % |
| $CaO + MgO + BaO$ | 0.5 to 35 wt % |
| F | 0 to 2 wt % |

Further, U.S. Pat. No. 5,342,810 discloses a glass frit having the following composition:

| | |
|---|---|
| ZnO | 31 to 50 mol % |
| $SiO_2$ | 10 to 44 mol % |
| $B_2O_3$ | 11 to 35 mol % |
| $Na_2O$ | 11 to 25 mol % |
| $Li_2O$ | 0 to 4 mol % |
| $TiO_2$ | 0 to 10 mol % |
| $ZrO_2$ | 0 to 25 mol % |
| CaO | 0 to 12 mol % |
| SrO | 0 to 12 mol % |
| BaO | 0 to 12 mol % |
| F | 0 to 8 mol % |

However, the compositions specifically disclosed in Examples of these two documents have a relatively small content of $SiO_2$ and a large content of $Na_2O$, and accordingly, they are believed to be inferior in chemical durability, particularly acid resistance.

Further, U.S. Pat. No. 5,306,674 discloses a glass frit having the following composition:

| | |
|---|---|
| ZnO | 20 to 40 wt % |
| $B_2O_3$ | 20 to 32 wt % |
| $SiO_2$ | 10 to 30 wt % |
| $TiO_2$ | 0 to 12 wt % |
| $Na_2O$ | 4 to 12 wt % |
| $K_2O$ | 0 to 10 wt % |
| $ZrO_2$ | 0 to 12 wt % |
| $Al_2O_3$ | 0 to 4 wt % |
| $Li_2O$ | 0 to 5 wt % |
| BaO | 0 to 10 wt % |
| CaO | 0 to 5 wt % |
| SrO | 0 to 5 wt % |
| MgO | 0 to 5 wt % |
| F | 0 to 5 wt % |

As a bending method for a window glass for an automobile, a production mode of a system so-called an in-furnace bending method has been employed in recent years for the purposes of improving the productivity and precision in bending, wherein a pressing apparatus or a bend adsorption-shaping apparatus is provided in a heating furnace, and bending is carried out in the furnace (at a temperature of from 570 to 700° C.). If the above-mentioned colored ceramic paste is used for the in-furnace bending method, the colored ceramic composition is likely to adhere to the heat-resistant cloth such as a glass cloth which is usually employed on the surface of the pressing die or the adsorption die for bending, whereby the so-called release property tends to be poor, and the productivity tends to decrease, such being undesirable.

SUMMARY OF THE INVENTION

It is an object of the present invention to overcome the above problems inherent to the prior art and to provide a colored ceramic composition which does not contain lead, cadmium and bismuth and which is excellent in the release property without having the strength of the glass plate impaired, and a method for producing a curved glass plate employing it.

The present invention provides, a colored ceramic composition comprising, as inorganic components, from 5 to 40 wt % of a colored heat resistance pigment powder, from 60 to 95 wt % of a zinc-containing glass powder and from 0 to 10 wt % of a refractory filler powder, wherein said glass powder consists essentially of the following components:

| | |
|---|---|
| $SiO_2$ | 27 to 40 wt % |
| $B_2O_3$ | 10 to 20 wt % |
| ZnO | 35 to 45 wt % |
| $Li_2O$ | 0 to 5 wt % |
| $Na_2O$ | 0 to 10 wt % |
| $K_2O$ | 0 to 5 wt % |
| $Li_2O + Na_2O + K_2O$ | 0 to 15 wt %, | and a method for producing a curved glass plate employing it.

DETAILED DESCRIPTION OF THE PREFERRED EMBODIMENTS

The colored ceramic composition of the present invention is suitable for being baked on a glass plate commonly used for e.g. windows, i.e. a soda lime-silica glass plate having a composition consisting essentially of from 68 to 74 wt % of $SiO_2$, from 0.5 to 20 parts by weight of $Al_2O_3$, from 7 to 12 wt % of CaO, from 2 to 5 wt % of MgO and from 9 to 15 wt % of $Na_2O$. With the colored ceramic composition of the present invention, a part of the crystallizable glass powder is crystallized under heating, whereby the colored ceramic composition is baked on the glass plate and thus will not deposit on the die in a press bending process.

In the colored ceramic composition of the present invention, if the content of the colored heat resistant pigment powder is less than 5 wt %, the desired concentration cannot be obtained. On the other hand, if it exceeds 40 wt %, the amount of glass tends to be too small, whereby it will be difficult to have the composition baked on a glass plate at a temperature for bend-processing of the glass plate. Preferably, the content is from 10 to 38 wt %. Such a colored heat resistant pigment may, for example, be the one composed mainly of an oxide of iron and manganese, the one composed mainly of an oxide of copper and chromium, or the one composed mainly of an oxide of cobalt and chromium.

The refractory filler powder is not essential. However, by incorporating this refractory filler powder, it is possible to control the thermal expansion coefficient and the fluidity. If the content of the refractory filler powder exceeds 10 wt %, the glass content tends to be too small, and it tends to be difficult to have the composition baked on a glass plate at a temperature for bend-processing of the glass plate. Such a refractory filler may, for example, be α-alumina, α-quartz, zircon, cordierite, forsterite or bismuth titanate.

If the content of the crystallizable glass powder is less than 60 wt %, it tends to be difficult to have the composition baked on a glass plate at a temperature for bend-processing of the glass plate, and if it exceeds 95 wt %, the content of the colored heat-resistant pigment powder will be so small that the desired concentration can not be obtained.

The reasons for defining the glass composition are as follows.

$SiO_2$ is a network former of glass, and it is necessary also for controlling the chemical and thermal properties. If its content is less than 27 wt %, the chemical durability and the release-property tend to be poor, and if it exceeds 40 wt %, the softening point of glass tends to be so high that it will be difficult to have the composition baked on a glass plate at a temperature for bend-processing of the glass plate. More preferably, the content is within a range of from 29 to 37 wt %.

$B_2O_3$ serves as a flux and is necessary for improving the melting property of glass. If its content is less than 10 wt %, the fluidity upon softening of glass tends to be poor, and it tends to be difficult to have the composition baked on the glass plate at a temperature for bend-processing of the glass plate, and if it exceeds 20 wt %, the die release property tends to be inferior. More preferably, the content is within a range of from 12 to 19 wt %.

ZnO serves as a flux and is necessary for improving the melting property of glass. If its content is less than 35 wt %, fluidity upon softening of glass tends to be poor, and it tends to be difficult to have the composition baked on the glass plate at a temperature for bend-processing of the glass plate. On the other hand, if its content exceeds 45 wt %, the chemical durability, particularly sulfuric acid resistance, tends to be poor. More preferably, the content is within a range of from 12 to 19 wt %.

$Li_2O$, $Na_2O$ and $K_2O$ are used as flux agents. They are not essential. However, when incorporated, these components are very effective to lower the softening point of glass. If the total amount of these components exceeds 15 wt %, the chemical durability tends to be low, and the thermal expansion coefficient tends to be too large, whereby strength of the glass plate decreases. With respect to the contents of the respective components, the content of each of $Li_2O$ and $K_2O$ is preferably at most 5 wt %, more preferably at most 4 wt %, and the content of $Na_2O$ is preferably at most 10 wt %, more preferably at most 8 wt %. Further, the total amount is preferably at most 10 wt %.

This glass is preferably a crystallizable glass which is capable of precipitating zinc-containing crystals within a temperature range of from 570° to 700° C. This temperature range corresponds to the temperature range for bend-processing a glass plate of soda lime silica which is a window glass for vehicles. Accordingly, if the colored ceramic composition is coated on a desired portion of a glass plate, and the glass plate is subjected to heat-bending processing, a part of the crystallizable glass crystallizes, and the apparent viscosity will be high, whereby the composition will not adhere to the pressing mold.

The weight average diameter of the above-mentioned respective materials is preferably within a range of from 0.1 to 10 μm. If the weight average diameter is smaller than 0.1 μm, the productivity will be substantially poor, and the product will be expensive. On the other hand, if it is larger than 10 μm, the screen-printing property of the paste tends to be poor. More preferably, the weight average diameter is from 1 to 6 μm.

In the method for producing a curved glass plate of the present invention, firstly an organic vehicle is incorporated to such a colored ceramic composition to obtain a paste. As the organic vehicle, the one having a commonly employed polymer such as ethyl cellulose, an acrylic resin, a styrene resin, a phenol resin or butyral, dissolved in a solvent such as α-terpineol, butylcarbitol acetate or a phthalic acid ester, may be used.

Then, the paste of the ceramic color composition is coated by a coating means such as screen-printing at a desired portion of a glass plate surface of soda lime silica glass to be used as a usual window glass. The portion to be coated is, for example, a peripheral portion of a front glass, a side glass or a rear glass in the case of a glass plate for an automobile.

Then, the glass plate coated with such a ceramic color composition is dried and, if necessary, e.g. a silver paste is printed on a part of the colored ceramic layer, followed by drying, and then the coated glass plate is transferred into a heating furnace and heated. This heating temperature is from 500° to 620° C., and the colored ceramic composition fuses to the glass plate at such a temperature.

Then, the glass is further maintained at a temperature of from 600° to 700° C., whereby the crystallizable glass in the fused colored ceramic composition will be crystallized, and the colored ceramic composition will be baked to the glass plate. At the same time, the glass plate will be bent by a shaping apparatus such as a pressing apparatus or a vacuum adsorption shaping apparatus provided in the furnace, in accordance with a conventional method. Here, a stainless steel covered with a cloth of glass fibers, is usually employed as the die for the pressing apparatus or the vacuum adsorption shaping apparatus, and the glass plate is pressed via this cloth.

Now, the present invention will be described in further detail with reference to Examples. However, it should be understood that the present invention is by no means restricted by such specific Examples.

Examples 1 to 4 and Comparative Examples 1 to 3

Starting materials were blended so as to obtain the glass composition (unit: wt %) as shown in Table 1 and melted and vitrified at a temperature of from 1,400° to 1,500° C. to obtain a crystallizable glass. Then, this crystallizable glass was pulverized by a ball mill to obtain a crystallizable glass powder having a weight average particle diameter of about 2.5 μm. This crystallizable glass powder, a black heat-resistant pigment powder (302 A, manufactured by Nippon Ferro Corporation) and a refractory filler (cordierite) were mixed in the weight ratios shown in the column for "Paste composition" in Table 1.

Then, added to 80 parts by weight of this mixed powder was 20 parts by weight of α-terpineol solution having 10 wt % ethyl cellulose dissolved therein, and the mixture was kneaded and uniformly dispersed by a three-roll mill to adjust the viscosity to a desired paste viscosity to obtain a paste of the colored ceramic composition. The paste of the colored ceramic composition thus obtained, was screen-printed over the entire surface of a soda lime silica glass plate (thickness: 3.5 mm, size: 10 cm×10 cm) and then dried.

This glass plate was heated to 650° C. to crystallize the crystallizable glass and to bake the color ceramic composition to the glass plate, and at the same time, this glass plate was pressed by a pressing die covered with a glass cloth, provided in this furnace, to evaluate the release property. Further, this glass plate was secured on a cylindrical jig of 100 mm in diameter, and the center of the glass plate was pressed from above, whereby the breaking load was measured. The results are also shown in Table 1. In the Table, symbol ⊚ in the column for the mold release property indicates the case where no residue of the colored ceramic composition was visually observed on the glass cloth covering the pressing die after the mold release property evaluation test. Symbol Δ indicates the case where the deposition of the colored ceramic composition on the glass cloth was observed over an area of about 20% of the contact area, and symbol × indicates the case where the deposition of the colored ceramic composition on the glass cloth was observed over the entire surface of the contact area, and the impression of the glass cloth remained in the colored ceramic composition.

Further, the glass plate was heated to 650° C. to crystallize the crystallizable glass and to bake the colored ceramic composition to the glass plate. Then, the glass plate was immersed in 0.1 N sulfuric acid and maintained at 40° C. for 5 hours, and then it was taken out and the surface condition of colored ceramic composition was visually observed to evaluate the acid resistance. The results are shown in Table 1. In the Table, symbol ○ indicates the case where no change was observed in the surface condition or the color of the colored ceramic composition as between before and after the test. Symbol Δ indicates a case where the color of the surface of the colored ceramic composition tended to be slightly whitened. Symbol × indicates the case where the color change of the colored ceramic composition was substantial and peeling from the substrate glass plate was observed.

As Comparative Examples, colored ceramic compositions were prepared in the same manner as Examples, and they were baked on glass plates, whereupon the same evaluations were carried out. The results are also shown in Table 1. It is apparent from Table 1 that the colored ceramic compositions of the present invention are excellent in the mold release property and the bending strength of the glass plates.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| Glass composition |  |  |  |  |  |  |  |
| $SiO_2$ | 35.4 | 31.4 | 37.0 | 29.9 | 18.5 | 42.5 | 35.5 |
| $B_2O_3$ | 13.7 | 18.2 | 19.0 | 12.0 | 32.0 | 7.5 | 25.0 |
| ZnO | 42.6 | 42.5 | 36.4 | 44.1 | 33.5 | 45.0 | 15.0 |
| $Li_2O$ | 2.0 | 1.8 | — | 3.5 | 5.0 | 3.0 | 6.5 |
| $Na_2O$ | 6.5 | 6.1 | 4.2 | 7.2 | 9.0 | 0 | 11.5 |
| $K_2O$ | — | — | 3.4 | 3.3 | 2.0 | 2.0 | 6.5 |
| Paste composition |  |  |  |  |  |  |  |
| Glass | 70 | 75 | 80 | 85 | 65 | 90 | 70 |
| Heat resistant pigment | 30 | 22 | 20 | 13 | 25 | 10 | 25 |
| Filler | — | 3 | — | 2 | 10 | — | 5 |
| Mold release property | ⊚ | ⊚ | ⊚ | ⊚ | X | Δ | X |
| Glass plate breaking load (kg) | 65 | 68 | 60 | 62 | 45 | 50 | 46 |
| Acid resistance | ○ | ○ | ○ | ○ | X | Δ | X |

The colored ceramic composition of the present invention is capable of providing a curved glass plate useful for e.g. window glass for vehicles, which is free from fusion to a pressing die and free from deterioration in the strength during the press bending process of the glass plate.

What is claimed is:

1. A colored ceramic composition comprising, as inorganic components, from 5 to 40 wt % of a colored heat resistance pigment powder, from 60 to 95 wt % of a zinc-containing glass powder and from 0 to 10 wt % of a refractory filler powder, wherein said glass powder consists essentially of the following components:

| | |
| --- | --- |
| $SiO_2$ | 27 to 40 wt % |
| $B_2O_3$ | 10 to 20 wt % |
| ZnO | 35 to 45 wt % |

-continued

| | |
|---|---|
| Li$_2$O | 0 to 5 wt % |
| Na$_2$O | 0 to 10 wt % |
| K$_2$O | 0 to 5 wt % |
| Li$_2$O + Na$_2$O + K$_2$O | 0 to 15 wt %. |

2. The colored ceramic composition according to claim 1, wherein the glass powder is subjected to heat treatment at a temperature of from 570° to 700° C. for crystallization.

3. The colored ceramic composition of claim 1, wherein said colored heat resistant pigment powder is present in an amount of 10 to 38 wt. %.

4. The colored ceramic composition of claim 1, wherein said colored heat resistant pigment powder is selected from the group consisting of pigments composed of an oxide of iron and manganese, pigments composed of an oxide of copper and chromium, and pigments composed of an oxide of cobalt and chromium.

5. The colored ceramic composition of claim 1, wherein said refractory filler powder is selected from the group consisting of α-alumina, α-quartz, zircon, cordierite, forsterite, and bismuth titanate.

6. The colored ceramic composition of claim 1, wherein said SiO$_2$ is present in said glass powder in an amount of from 29 to 37 wt. %.

7. The colored ceramic composition of claim 1, wherein said B$_2$O$_3$ is present in said glass powder in an amount of from 12 to 19 wt. %.

8. The colored ceramic composition of claim 1, wherein said ZnO is present in said glass powder in an amount of from 36.4 to 44.1 wt. %.

9. The colored ceramic composition of claim 1, wherein said Li$_2$O is present in said glass powder in an amount of at most 4 wt. %.

10. The colored ceramic composition of claim 1, wherein said K$_2$O is present in said glass powder in an amount of at most 4 wt. %.

11. The colored ceramic composition of claim 1, wherein said Na$_2$O is present in said glass powder in an amount of at most 8 wt. %.

12. The colored ceramic composition of claim 1, wherein said Li$_2$O, said Na$_2$O, and said K$_2$O are present in said glass powder in a total amount of at most 10 wt. %.

13. The colored ceramic composition of claim 1, wherein said colored heat resistance pigment powder, said glass powder, and said refractory powder have a weight average diameter of 0.1 to 10 μm.

14. The colored ceramic composition of claim 1, wherein said colored heat resistance pigment powder, said glass powder, and said refractory powder have a weight average diameter of 1 to 6 μm.

15. The colored ceramic composition of claim 1, wherein said Li$_2$O is present in said glass powder in an amount of at most 4 wt. %; said K$_2$O is present in said glass powder in an amount of at most 4 wt. %; and said Na$_2$O is present in said glass powder in an amount of at most 8 wt. %.

16. The colored ceramic composition of claim 1, wherein said Li$_2$O is present in said glass powder in an amount of at most 4 wt. %; said K$_2$O is present in said glass powder in an amount of at most 4 wt. %; and said Na$_2$O is present in said glass powder in an amount of at most 8 wt. %; and wherein said Li$_2$O, said Na$_2$O, and said K$_2$O are present in a total amount of at most 10 wt. %.

17. The colored ceramic composition of claim 1, wherein said SiO$_2$ is present in said glass powder in an amount of from 29 to 37 wt. %; and said B$_2$O$_3$ is present in said glass powder in an amount of from 12 to 19 wt. %.

18. The colored ceramic composition of claim 1, wherein said SiO$_2$ is present in said glass powder in an amount of from 29 to 37 wt. %; said B$_2$O$_3$ is present in said glass powder in an amount of from 12 to 19 wt. %; and said ZnO is present in said glass powder in an amount of from 36.4 to 44.1 wt. %.

19. The colored ceramic composition of claim 1, wherein said SiO$_2$ is present in said glass powder in an amount of from 29 to 37 wt. %; said B$_2$O$_3$ is present in said glass powder in an amount of from 12 to 19 wt. %; said ZnO is present in said glass powder in an amount of from 36.4 to 44.1 wt. %; said Li$_2$O is present in said glass powder in an amount of at most 4 wt. %; said K$_2$O is present in said glass powder in an amount of at most 4 wt. %; and said Na$_2$O is present in said glass powder in an amount of at most 8 wt. %.

20. The colored ceramic composition of claim 1, wherein said SiO$_2$ is present in said glass powder in an amount of from 29 to 37 wt. %; said B$_2$O$_3$ is present in said glass powder in an amount of from 12 to 19 wt. %; said ZnO is present in said glass powder in an amount of from 36.4 to 44.1 wt. %; said Li$_2$O is present in said glass powder in an amount of at most 4 wt. %; said K$_2$O is present in said glass powder in an amount of at most 4 wt. %; and said Na$_2$O is present in said glass powder in an amount of at most 8 wt. %; and wherein said Li$_2$O, said Na$_2$O, and said K$_2$O are present in a total amount of at most 10 wt. %.

\* \* \* \* \*